United States Patent
Moisy et al.

(10) Patent No.: US 10,488,012 B2
(45) Date of Patent: Nov. 26, 2019

(54) LIGHT MODULE FOR A MOTOR VEHICLE COMPRISING TWO LIGHT GUIDES AND A HEAT SINK WITH TWO MOUNTING FACES

(71) Applicant: Valeo Iluminacion, Martos (ES)

(72) Inventors: Eric Moisy, Jaen (ES); Jose-Manuel Lomas, Martos (ES); Ricardo Fernandez, Martos (ES); Juan-Francisco Moreno, Torremolinos (ES); Damien Cabanne, Martos (ES); Mickael Huau, La Chapelle Saint Laud (FR); Francois Coz, Villeveque (FR); Juan-Manuel Martinez, Granada (ES)

(73) Assignee: VALEO ILUMINACION, Martos (ES)

( * ) Notice: Subject to any disclaimer, the term of this patent is extended or adjusted under 35 U.S.C. 154(b) by 35 days.

(21) Appl. No.: 15/075,466

(22) Filed: Mar. 21, 2016

(65) Prior Publication Data

US 2016/0281954 A1    Sep. 29, 2016

(30) Foreign Application Priority Data

Mar. 23, 2015    (FR) ...................................... 15 52364

(51) Int. Cl.
*F21S 8/00* (2006.01)
*F21S 45/47* (2018.01)
*B60Q 1/04* (2006.01)
(Continued)

(52) U.S. Cl.
CPC .............. *F21S 45/47* (2018.01); *B60Q 1/007* (2013.01); *B60Q 1/0408* (2013.01); *B60Q 1/2607* (2013.01); *F21S 43/14* (2018.01); *F21S 43/19* (2018.01); *F21S 43/237* (2018.01); *F21S 43/245* (2018.01); *F21S 43/247* (2018.01); *F21S 43/249* (2018.01); *F21S 43/27* (2018.01);
(Continued)

(58) Field of Classification Search
CPC ......... B60Q 1/0408; F21S 8/10; F21S 48/211; F21S 48/215; F21S 48/321; F21S 48/1208; F21S 48/1241; F21S 48/2206; F21S 48/2237; F21S 48/2261; F21S 48/2281; F21V 29/00
USPC .......................................... 362/294, 373, 511
See application file for complete search history.

(56) References Cited

U.S. PATENT DOCUMENTS 6,779,929 B1 * 8/2004 Savage, Jr. ............ G02B 6/322
                                                          385/88
8,083,375 B2   12/2011 Kong
(Continued)

FOREIGN PATENT DOCUMENTS

| EP | 2592333 A2 | 5/2013 |
|---|---|---|
| EP | 2775197 A1 | 9/2014 |
| KR | 100993226 B1 | 11/2010 |

*Primary Examiner* — Sean P Gramling
*Assistant Examiner* — Keith G. Delahoussaye
(74) *Attorney, Agent, or Firm* — Oblon, McClelland, Maier & Neustadt, L.L.P.

(57) ABSTRACT

A light module for a motor vehicle comprising
a heat sink comprising at least two mounting faces forming an angle ($\theta$) between them,
at least two light guides, each comprising an input face and a branch, and,
at least two light sources, each arranged at one of the input faces of the light guides which is associated with it,
in which each input face is arranged facing one of the mounting faces of the heat sink and is adapted to couple the light rays emitted by the light source into the associated light guide.

20 Claims, 7 Drawing Sheets

(51) Int. Cl.
| | |
|---|---|
| *B60Q 1/00* | (2006.01) |
| *B60Q 1/26* | (2006.01) |
| *F21S 43/19* | (2018.01) |
| *F21S 43/14* | (2018.01) |
| *F21S 43/27* | (2018.01) |
| *F21S 43/237* | (2018.01) |
| *F21S 43/245* | (2018.01) |
| *F21S 43/249* | (2018.01) |
| *F21S 43/247* | (2018.01) |
| *F21S 45/49* | (2018.01) |
| *F21S 45/48* | (2018.01) |

(52) U.S. Cl.
CPC .............. *F21S 45/48* (2018.01); *F21S 45/49* (2018.01); *B60Q 2400/20* (2013.01)

(56) References Cited

U.S. PATENT DOCUMENTS

| | | | |
|---|---|---|---|
| 8,882,316 B2 | 11/2014 | Natsume et al. | |
| 9,039,260 B2 | 5/2015 | Faffelberger | |
| 2009/0213606 A1* | 8/2009 | Coushaine | F21S 41/24 |
| | | | 362/507 |
| 2011/0205737 A1 | 8/2011 | Kong | |
| 2012/0051077 A1 | 3/2012 | Arai | |
| 2012/0069592 A1* | 3/2012 | Natsume | B60Q 1/0052 |
| | | | 362/511 |
| 2012/0106148 A1* | 5/2012 | De Silva | F21S 8/086 |
| | | | 362/235 |
| 2013/0114277 A1 | 5/2013 | Faffelberger | |
| 2013/0322104 A1* | 12/2013 | Baert | G02B 6/4292 |
| | | | 362/511 |

\* cited by examiner

LIGHT MODULE FOR A MOTOR VEHICLE COMPRISING TWO LIGHT GUIDES AND A HEAT SINK WITH TWO MOUNTING FACES

CROSS-REFERENCE TO RELATED APPLICATIONS

This application claims priority to the French application 1552364 filed on Mar. 23, 2015, which application is incorporated herein by reference and made a part hereof.

BACKGROUND OF THE INVENTION

1. Field of the Invention

The present invention relates to a light module for a motor vehicle.

It is applicable in particular, but in a nonlimiting manner, in lighting devices, such as motor vehicle headlights.

2. Description of the Related Art

A light module for a motor vehicle, and notably for a motor vehicle headlight, comprises, as is known to those skilled in the art:

a heat sink comprising a planar face;
two light guides each comprising an input face and a branch; and
a plurality of light sources arranged on the heat sink at the input faces of each light guide, an input face being adapted to couple the light rays emitted by the light sources into the light guide.

The input faces of the light guides are arranged on a plane parallel to the planar face of the heat sink. The branches of the two light guides are thus parallel to one another.

One drawback with this state of the art is that, depending on the arrangement of the light guides in the headlight, their input face cannot always be arranged on a plane parallel to the planar face of the heat sink. This results in light losses at the input face of each guide. The guides are consequently less effective.

In this context, the present invention aims to resolve the abovementioned drawback.

SUMMARY OF THE INVENTION

To this end, the invention proposes a light module for a motor vehicle comprising:

a heat sink comprising at least two mounting faces forming an angle between them;
at least two light guides, each comprising an input face and a branch;
at least two light sources, each arranged at one of the input faces of the light guides which is associated with it;
in which each input face is arranged facing one of the mounting faces of the heat sink and is adapted to couple the light rays emitted by the light source into the associated light guide.

Thus, as will be seen in detail herein below, by using a heat sink with two mounting faces, this makes it possible to have a flexible design and arrangement of the light guides in the headlight. In effect, with the two mounting faces exhibiting an angle between them, they make it possible to always have the input faces of the light guides arranged on a plane parallel to the mounting faces. There are thus no light losses. It is thus possible to adapt the angle between the two mounting faces of the heat sink according to the arrangement of the light guides in the headlight.

According to nonlimiting embodiments, the light module can further comprise one or more additional features out of the following:

In a nonlimiting embodiment, the guides are distinct and the branches are distinct and they extend in distinct directions.

In a nonlimiting embodiment, the mounting faces are planar.

In a nonlimiting embodiment, the mounting faces extend on a same side of the heat sink.

In a nonlimiting embodiment, the heat sink comprises cooling fins arranged on a side opposite to that of the mounting faces.

In a first nonlimiting embodiment, the light source(s) and associated light guide assembly is adapted to emit white light to produce a first photometric function.

In a second nonlimiting embodiment, the light source(s) and associated light guide assembly is adapted to emit amber light to produce a second photometric function.

In a third nonlimiting embodiment, the light source(s) and associated light guide assembly is adapted to emit white light to produce a first photometric function and amber light to produce a second photometric function.

In a nonlimiting variant, the first photometric function is a DRL function, to produce a daytime-running light.

In a nonlimiting variant, the second photometric function is an ID function to produce a direction indicator.

In a nonlimiting embodiment, a plurality of light sources is arranged at one of the input faces of the light guides which is associated with it.

In a nonlimiting embodiment, the angle is strictly greater than 0°, notably strictly less than 180°.

In a nonlimiting embodiment, an input face is arranged facing a mounting face of the heat sink on an axis substantially at right angles to the mounting face.

In a nonlimiting embodiment, the light module further comprises at least one printed circuit board to which the light sources are connected.

In a nonlimiting variant embodiment, the light module comprises two printed circuit boards to which the light sources of each associated light guide are respectively connected.

In a first nonlimiting embodiment, each light guide is mounted directly on one of the mounting faces of the heat sink which is associated with it.

According to this first embodiment, in a first nonlimiting variant embodiment, the at least one printed circuit board is mounted directly on a mounting face of the heat sink.

According to this first embodiment, in a second nonlimiting variant embodiment, the printed circuit board is mounted on a third mounting face of the heat sink, different from the mounting faces facing which the light guides are arranged.

The printed circuit board is mounted on a mounting face of the heat sink so as to extend at a distance from the point facing which the light guide is arranged.

According to this first embodiment, in a nonlimiting embodiment, at least one light source is mounted directly on each mounting face of the heat sink.

According to this first embodiment, in a nonlimiting variant embodiment, the at least one light source is connected to the printed circuit board by means of a wire-bonding via a metal wire.

In a second nonlimiting embodiment, the light module further comprises a support element comprising two support faces which are superposed respectively on the two mounting faces of the heat sink, each light guide being mounted directly on one of the support faces which is associated with it.

According to this second embodiment, in a nonlimiting embodiment, the at least one printed circuit board forms the support element.

According to a nonlimiting variant embodiment, the printed circuit board comprises two parts which are the two support faces and which are linked together via a connection element.

According to this second embodiment, in a nonlimiting embodiment, the light sources are mounted on the at least one printed circuit board.

In a nonlimiting embodiment, the light sources are semiconductive emitting chips.

In a nonlimiting variant embodiment, a semiconductive emitting chip forms part of a light-emitting diode.

In a nonlimiting embodiment, each mounting face of the heat sink comprises a first referencing means and each light guide further comprises a complementary referencing means cooperating with the first referencing means.

According to a nonlimiting variant embodiment, the first referencing means are referencing orifices, and the complementary referencing means are referencing pins.

According to another variant, the first referencing means comprise an electronic component soldered onto a printed circuit board.

In a nonlimiting embodiment, each support face of the support element comprises a second referencing means and each light guide further comprises a complementary referencing means cooperating with the second referencing means.

In a nonlimiting embodiment, the light module further comprises a fixing clamp positioned over a part of the light guides.

In a nonlimiting embodiment, the fixing clamp comprises a first fixing orifice arranged facing a second fixing orifice of the heat sink.

A lighting device for a motor vehicle is also proposed comprising a light module according to any one of the preceding features, and further comprising a casing comprising a front face on the side of which are arranged the light guides and a rear face on which is mounted the heat sink, the casing comprising an opening into which are inserted the two mounting faces of the heat sink.

These and other objects and advantages of the invention will be apparent from the following description, the accompanying drawings and the appended claims.

BRIEF DESCRIPTION OF THE ACCOMPANYING DRAWINGS

The invention and its various applications will be better understood upon reading the following description and upon studying the accompanying figures.

DETAILED DESCRIPTION OF THE PREFERRED EMBODIMENTS

Figure 1:
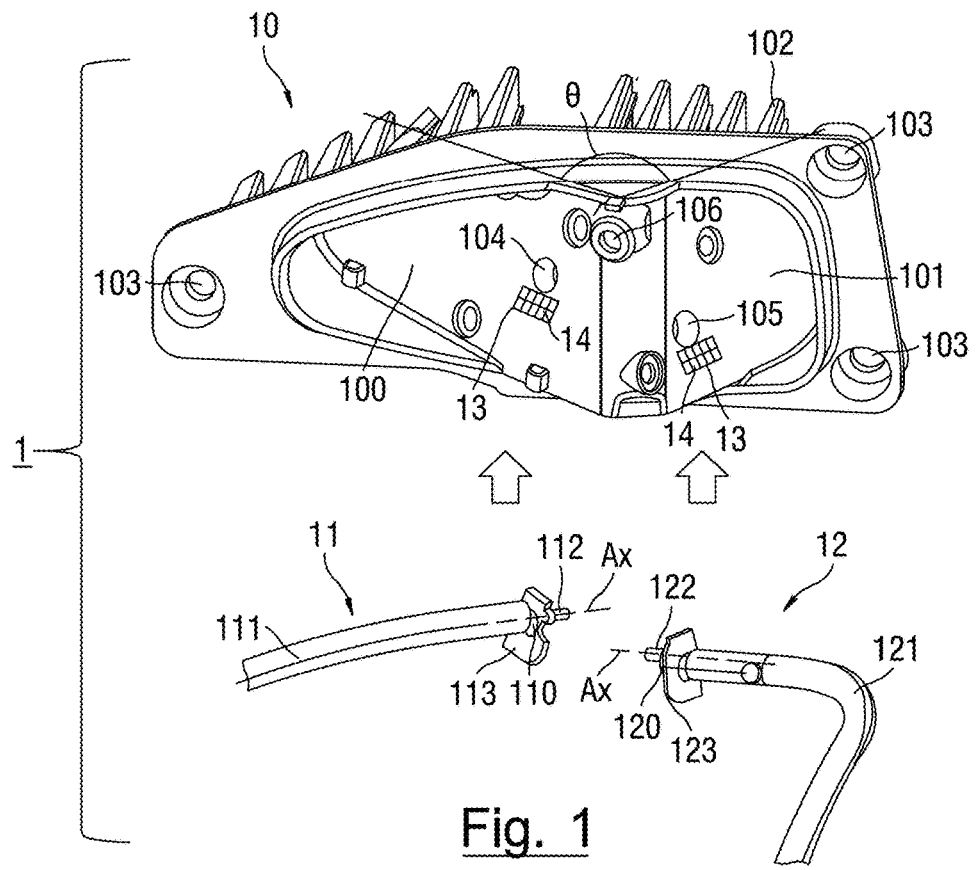
FIG. 1 represents an exploded view of a light module for a motor vehicle according to a first nonlimiting embodiment of the invention, the light module comprising a heat sink and two light guides, each comprising an input face and a branch.

The elements that are identical, by structure or by function, that appear in the various figures retain, unless otherwise stipulated, the same references.

The light module 1 for a motor vehicle V according to the invention is described with reference to FIGS. 1 to 10.

A motor vehicle should be understood to be any type of motorized vehicle.

A lighting device 2 of the motor vehicle V comprises the light module 1. In a nonlimiting example taken hereinafter in the description, the lighting device 2 is a headlight.

The light module 1 comprises:
 a heat sink 10 comprising at least two mounting faces 100 and 101 forming an angle θ between them;
 at least two light guides 11, 12, each comprising an input face 110, 120 and a branch 111, 121; and
 at least two light sources 14, each arranged at one of the input faces 110, 120 of the light guides 11, 12 which is associated with it.

In a nonlimiting embodiment, the light module 1 further comprises at least one printed circuit board 13, also called PCB, to which the light sources 14 are connected.

The various elements of the light module 1 are described in detail herein below.

Figure 5:
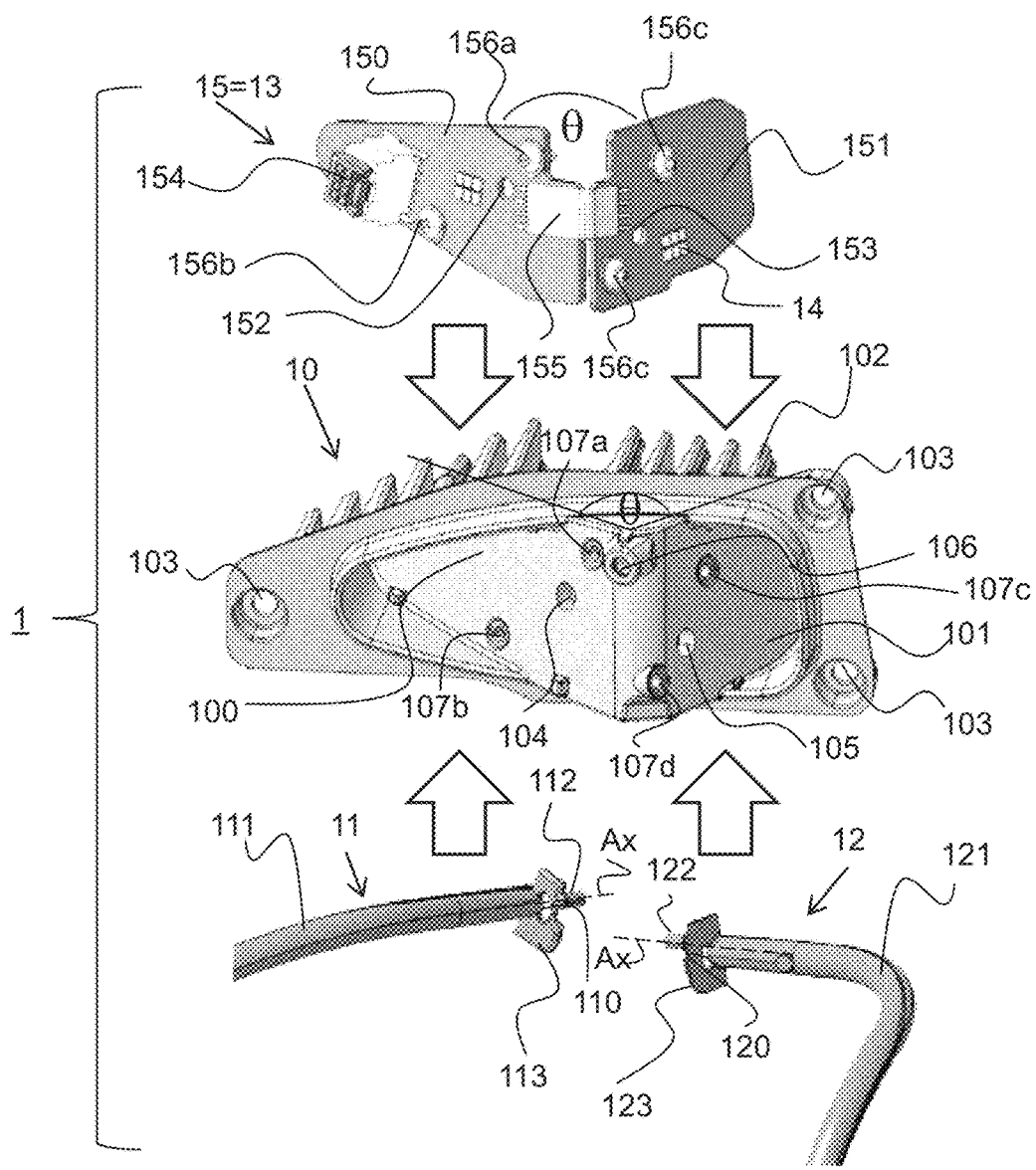
FIG. 5 represents an exploded view of a light module for a motor vehicle according to a second nonlimiting embodiment of the invention, the light module comprising a heat sink, a support element and two light guides, each comprising an input face and a branch.

As illustrated in FIGS. 1 and 5 in particular, the light guides 11, 12 are distinct and the branches 111, 121 respectively of the light guides 11, 12 are distinct. They extend in distinct directions and are distributed over a part of the headlight 2.

Each input face 110, 120 of the light guides 11, 12 is adapted to couple the light rays emitted by the light source 14 into the associated light guide 11, 12.

It will be noted that the light guides 11, 12 further comprise decoupling elements (not illustrated) which make it possible to make the light rays leave on output faces (not illustrated) of the light guides 11, 12. In a nonlimiting example, the decoupling elements are prisms.

In a nonlimiting embodiment, the light sources 14 are semiconductive emitting chips.

In a nonlimiting embodiment, a semiconductive emitting chip forms part of a light-emitting diode.

A light-emitting diode should be understood to be any kind of light-emitting diode, whether they be, in the non-limiting examples of the LEDs (Light Emitting Diodes), OLEDs (organic LEDs), AMOLEDs (Active-Matrix-Organic LEDs), or even FOLEDs (Flexible OLEDs).

In a first nonlimiting embodiment, the light source(s) 14 and associated light guides 11, 12 are adapted to emit white light to produce a first photometric function f1.

In a nonlimiting example, the first photometric function f1 is a DRL function to produce a daytime-running light.

In a second nonlimiting embodiment, the light source(s) 14 and associated light guides 11, 12 are adapted to emit amber light to produce a second photometric function f2. In a nonlimiting example, the second photometric function f2 is an ID function to produce a direction indicator.

In the case where a number of light sources 14 are arranged facing each input face 110, 120 of a light guide 11, 12, the first and second photometric functions f1, f2 can be produced in a same headlight 2.

Thus, in a third nonlimiting embodiment, the light source(s) 14 and associated light guides 11, 12 are adapted to emit white light to produce a first photometric function f1 and amber light to produce a second photometric function f2.

The light guides 11, 12 each further comprise a base 113, 123, each of which supports a complementary referencing means 112, 122. The bases 113, 123 are arranged respectively on a plane parallel to the input faces 110, 120 of the light guides 11, 12.

As illustrated in FIGS. 1 and 5 in particular, the heat sink 10 comprises cooling fins 102. The two mounting faces 100, 101 of the heat sink 10 are substantially planar and extend on a same side of the heat sink 10. Moreover, they are arranged on a side opposite the cooling fins 102 of the heat sink 10.

The two mounting faces 100, 101 make it possible to respectively mount the two light guides 11, 12 on the heat sink 10 whether directly (first embodiment described later) or via a support element (second embodiment described later).

To this end, in a nonlimiting embodiment, each mounting face 100, 101 of the heat sink 10 comprises a first referencing means 104, 105 and each light guide 11, 12 further comprises a complementary referencing means 112, 122 cooperating with the first referencing means 104, 105.

In a nonlimiting example, the first referencing means 104, 105 are referencing orifices, and the complementary referencing means 112, 122 are referencing pins.

More particularly, the referencing pin 112 is inserted into the referencing orifice 104 of the mounting face 100 while the referencing pin 122 is inserted into the referencing orifice 105 of the mounting face 101. That makes it possible to position each light guide 11, 12 correctly relative to the heat sink 10, and in particular each input face 110, 120 correctly relative to the associated light sources 14, and also avoid having the light guides 11, 12 move.

Thus, the input face 110 of the light guide 11 is arranged facing the mounting face 100 of the heat sink 10, and the input face 120 of the light guide 12 is arranged facing the mounting face 101 of the heat sink 10.

The angle θ between the two mounting faces 100, 101 of the heat sink 10 is adapted according to the arrangement of the branches 111, 121 of the light guides 11, 12 in the headlight 2 of the motor vehicle V.

Thus, in a nonlimiting embodiment, the angle θ is strictly greater than 0°, notably strictly less than 180°.

This angle θ makes it possible to arrange the input faces 110, 120 facing, respectively, the mounting faces 100, 101 and on an axis Ax (illustrated in FIG. 1 and in FIG. 5) which is substantially at right angles to the mounting faces 100, 101. The input faces 110, 120 are thus arranged parallel respectively to the mounting faces 100, 101. Thus, the coupling of the light rays emitted by the light sources 14 in the light guides 11, 12 is maximized.

As will be seen herein below, the angle θ thus makes it possible to have, for the heat sink 10, different planes facing which or on which the light sources 14 are arranged.

First Embodiment

FIG. 1 represents an exploded view of the light module 1 according to a first nonlimiting embodiment.

According to this embodiment, each light guide 11, 12 is mounted directly on one of the mounting faces 100, 101 of the heat sink 10 which is associated with it.

Thus, the guide 11 is mounted on the mounting face 100 and the guide 12 is mounted on the mounting face 101. The bases 113, 123 of the light guides 11, 12 are directly in contact, respectively, with the mounting faces 100, 101 of the heat sink 10.

Figure 2:
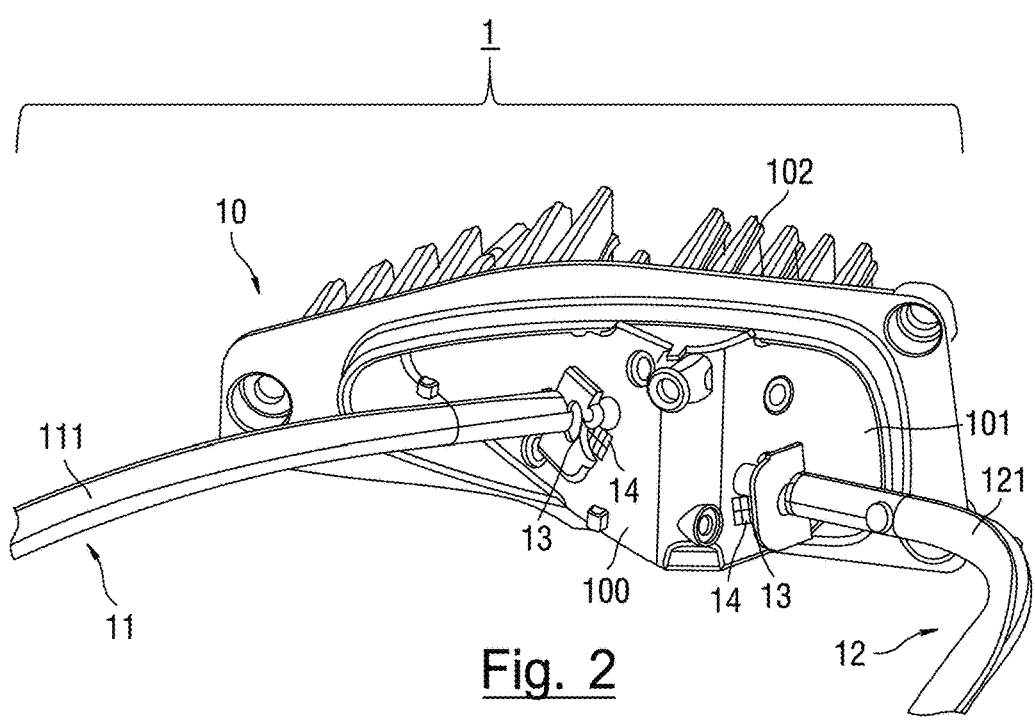
FIG. 2 represents the light module of FIG. 1 assembled according to a nonlimiting embodiment.
Figure 3:
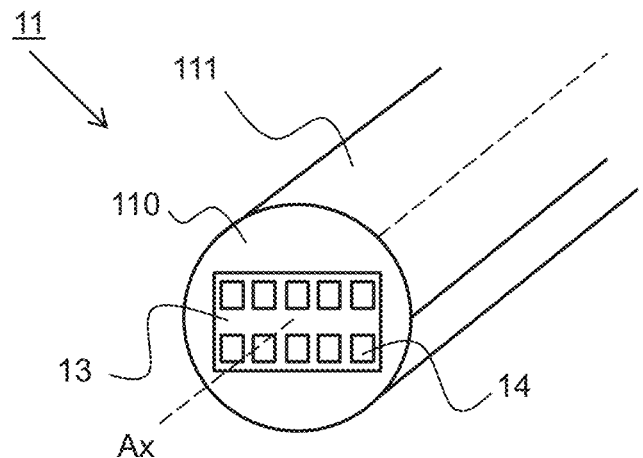
FIG. 3 is a diagram of light sources arranged at an input face of a light guide of FIGS. 1 and 2 according to a first nonlimiting embodiment.

FIG. 2 illustrates the light module 1 with the light guides 11, 12 which are assembled directly on the respective mounting faces 100, 101 of the heat sink 10. As can be seen, the branches 111, 121 of the light guides 11, 12 have different directions.

According to this embodiment, at least one printed circuit board 13 (not illustrated in FIG. 1) is mounted directly on a mounting face of the heat sink 10.

FIG. schematically represents a part of the light guide 11 according to a first nonlimiting embodiment. It will be noted that the same scheme applies for the light guide 12. In the figure, the input face 110 and a part of the branch 111 of the light guide 11 can be seen.

According to this embodiment, the light sources 14 are mounted on a printed circuit board 13, all being arranged facing the input face 110 of the associated light guide 11.

In the nonlimiting example illustrated, there are ten light sources 14 which are mounted on a common support which is thus the printed circuit board 13.

In this case, in a nonlimiting embodiment, a part of the light sources 14 is adapted to emit white light to produce the first photometric function f1 and another part of the light sources 14 is adapted to emit amber light to produce the second photometric function f2.

According to this embodiment, a printed circuit board 13 (not illustrated in FIG. 1) is mounted directly on each mounting face 100, 101 of the heat sink 10. The mounting is performed by gluing in a nonlimiting example. Thus, the light module 1 comprises a printed circuit board 13 for each group of light sources 14 of a light guide 11, 12, i.e. two printed circuit boards 13, a group of light sources 14 comprising one or more light sources 14.

Figure 4:
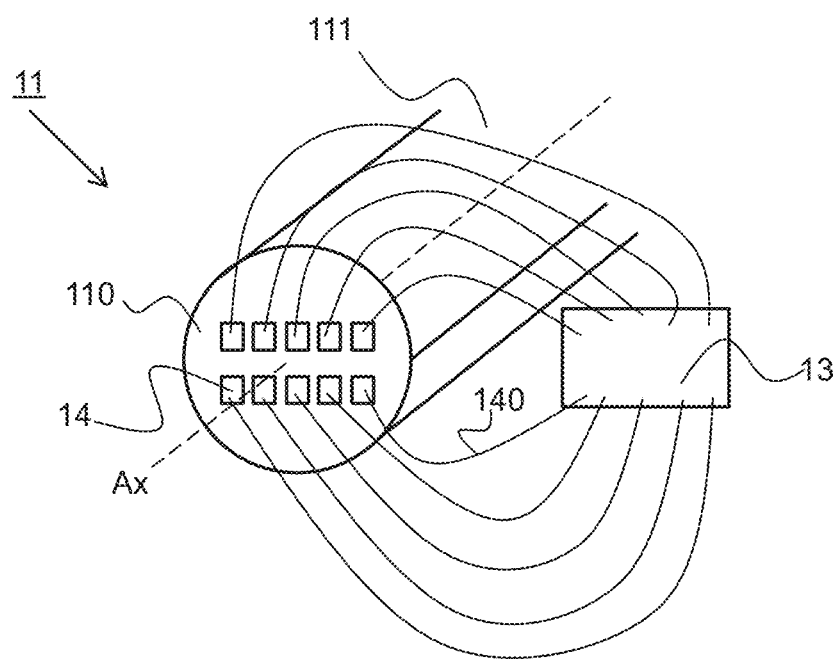
FIG. 4 is a diagram of light sources arranged at an input face of a light guide of FIGS. 1 and 2 according to a second nonlimiting embodiment.

FIG. 4 schematically represents a part of the light guide 11 according to a second nonlimiting embodiment. It will be noted that the same scheme applies for the light guide 12. In the figure, it is possible to see the input face 110, a part of the branch 111 of the light guide 11 and a printed circuit board 13 offset relative to the light guide 11 so as to be extended away from the point facing which the light guides 11, 12 are arranged.

According to this embodiment, at least one light source 14 is mounted on each mounting face 100, 101 of the heat sink 10.

Thus, the light sources 14 are arranged on a common support which is thus the heat sink 10.

In the nonlimiting example illustrated, there are ten light sources 14 per mounting face 100, 101.

In this case also, in a nonlimiting embodiment, a part of the light sources 14 is adapted to emit white light to produce the first photometric function f1 and another part of the light sources 14 is adapted to emit amber light to produce the second photometric function f2.

The light sources 14 are thus mounted directly on a mounting face 100, 101 of the heat sink 10 and are connected to the at least one printed circuit board 13 by means of a wire-bonding via a metal wire 140.

In a first nonlimiting variant embodiment of this second embodiment, the light module 1 comprises a printed circuit board 13 for each group of light sources 14 of each light guide 11, 12, i.e. two printed circuit boards 13.

In this variant, in a first nonlimiting example, each printed circuit board 13 is mounted on an associated mounting face 100, 101. In a second nonlimiting example, the two printed circuit boards 13 are mounted on a third mounting face (not illustrated) of the heat sink 10 so as to be extended away from the point facing which the associated light guide 11, 12 is arranged.

In a third nonlimiting example, the two printed circuit boards 13 are mounted respectively on a third and a fourth mounting face (not illustrated) of the heat sink 10 so as to be extended away from the point facing which the associated light guide 11, 12 is arranged.

In a nonlimiting example, the mounting of a printed circuit board 13 is performed by gluing.

In a second nonlimiting variant embodiment of this second embodiment, the light module 1 comprises a single printed circuit board 13 for all of the two groups of light sources 14 of the light guides 11, 12. In this variant, in a first nonlimiting example, the printed circuit board 13 is mounted on one of the mounting faces 100, 101 of the heat sink 10. In a second nonlimiting example, the printed circuit board 13 is mounted on a third mounting face (not illustrated) of the heat sink 10 so as to be extended away from the point facing which the light guides 11, 12 are arranged.

Second Embodiment

FIG. 5 represents an exploded view of the light module 1 according to a second nonlimiting embodiment.

According to this embodiment, the light module 1 further comprises a support element 15 comprising two support faces 150, 151 which are superposed respectively over the two mounting faces 100, 101 of the heat sink 10 and each light guide 11, 12 is mounted directly on one of the support faces 150, 151 of the support element 15 which is associated with it.

Thus, the light guide 11 is mounted on the support face 150 and the light guide 12 is mounted on the support face 151.

The bases 113, 123 of the light guides 11, 12 are directly in contact respectively with the support faces 150, 151 of the support element 15.

Thus, the support faces 150, 151 form an angle between them equal to θ and the light guides 11, 12 are mounted on the heat sink 10 by means of the support element 15.

FIG. 5 also illustrates a connector 154 linked to a control and power supply unit (not illustrated) for the light sources 14.

In a nonlimiting embodiment, each support face 150, 151 of the support element 15 comprises a second referencing means 152, 153 and the complementary referencing means 112, 122 (described previously) of each light guide 11, 12 cooperates with the associated second referencing means 152, 153.

In a nonlimiting example, the second referencing means 152 and 153 are referencing orifices. More particularly, the referencing pin 112 is inserted into the referencing orifice 152 of the support face 150 whereas the referencing pin 122 is inserted into the referencing orifice 153 of the support face 151.

These second referencing means 152, 153 are positioned respectively facing first referencing means 104, 105 of the heat sink 10 described previously.

In a nonlimiting embodiment, each support face 150, 151 of the support element 15 comprises mounting means 156 for assembling the support element 15 on the heat sink 10, the mounting means 156 cooperating with complementary mounting means 107 of the heat sink 10. In the nonlimiting example illustrated, the support face 150 comprises two mounting means 156a, 156b which cooperate respectively with two complementary mounting means 107a, 107b of the heat sink 10 and the support face 151 comprises two mounting means 156c, 156d which cooperate respectively with two complementary mounting means 107c, 107d of the heat sink 10. In a nonlimiting example, the mounting means 156 are screws and the complementary mounting means 107 are orifices.

According to this second embodiment illustrated in FIG. 5, at least one printed circuit board 13 forms the support element 15.

Thus, as can be seen, the printed circuit board 13 comprises two parts which are the two support faces 150, 151 and which are linked together via a connection element 155. The connection element 155 is configured so as to be able to set the angle θ between the two support faces 150, 151. In this way, the two support faces 150, 151 can be correctly parallel respectively relative to the two mounting faces 100, 101 of the heat sink 10.

According to this embodiment, the light sources 14 are mounted on the printed circuit board 13. In particular, each support face 150, 151 of the printed circuit board 13 comprises at least one light source 14. In the nonlimiting example illustrated, each support face 150, 151 comprises six light sources 14.

Thus, the light sources 14 are arranged on a common support which is the printed circuit board 13.

Figure 6:
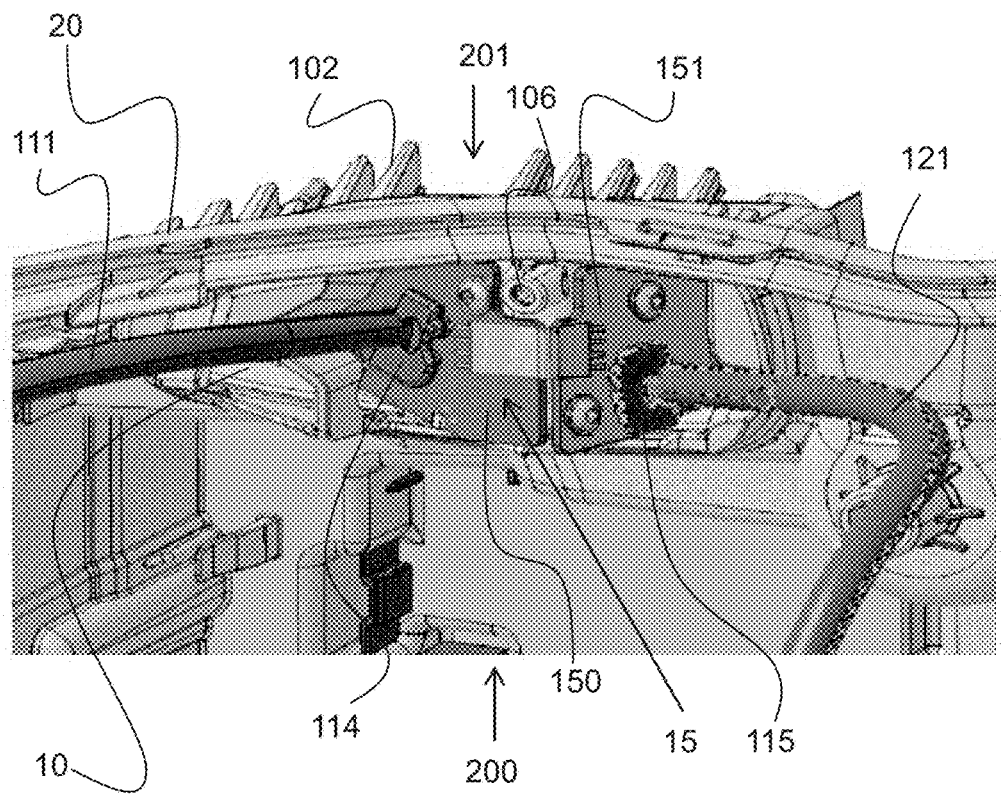
FIG. 6 represents the light module of FIG. 5 assembled and arranged in a casing of a lighting device according to a nonlimiting embodiment.

FIG. 6 illustrates the light module 1 with the light guides 11 and 12 which are assembled directly on the respective support faces 150 and 151 of the support element 15. It can also be seen that the light module 1 is mounted in a casing 20 of the headlight 2, a casing which is described later.

As can be seen, the branches 111 and 121 of the light guides 11 and 12 have distinct directions in the casing 20 of the headlight 2.

Figure 7:
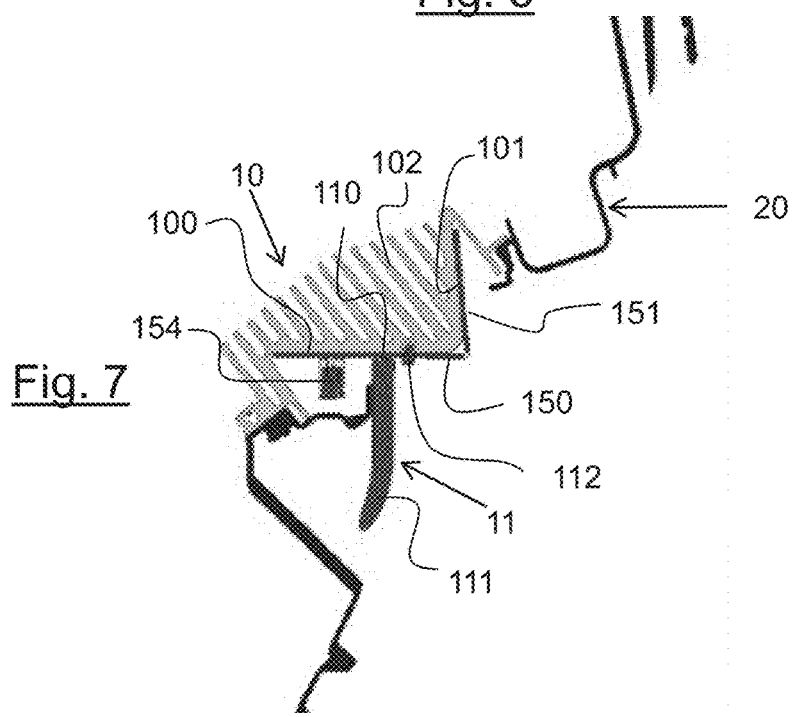
FIG. 7 represents a cross-sectional view of a part of the light module of FIG. 6.

FIG. 7 illustrates a cross-sectional view of a part of the light module 1 incorporated in the casing 20 of the headlight 2. In this cross section, there are the light guide 11 with its input face 110, its branch 111 and its referencing pin 112 inserted into the support face 150 of the support element 15 and into the mounting face 100 of the heat sink 10. The input face 110 of the light guide 11 is arranged parallel to the support face 150 so as to best couple the light rays emitted by the light sources 14.

In the figure, the connector 154 can also be seen. The two support faces 150 and 151 are in planar contact with, respectively, the two mounting faces 100 and 101 of the heat sink 10, the fins 102 of which can also be seen, situated on the side opposite the two mounting faces 100 and 101.

Figure 8:
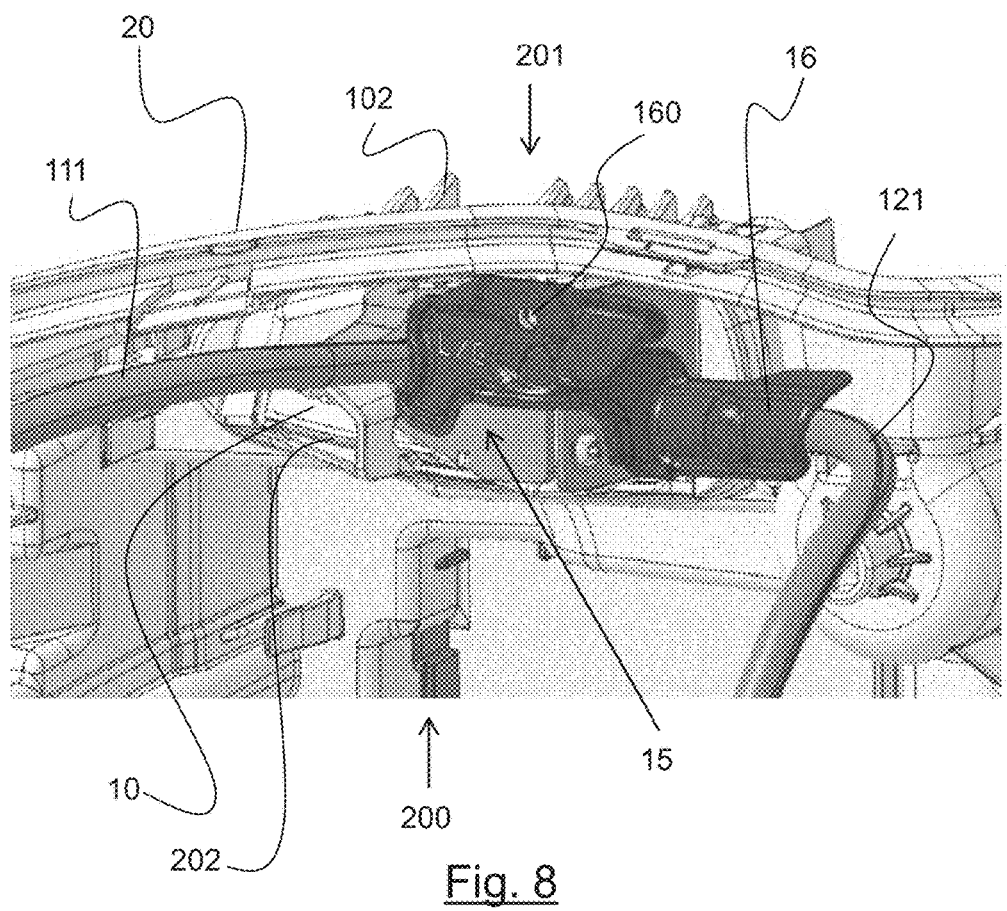
FIG. 8 represents the light module of FIG. 5 assembled and arranged in a casing of a lighting device, the light module further comprising a fixing clamp according to a nonlimiting embodiment.

As illustrated in FIG. 8, in a nonlimiting embodiment, the light module 1 further comprises a fixing clamp 16 positioned over a part of the light guides 11 and 12.

In a nonlimiting embodiment, the fixing clamp 16 comprises a form which is adapted to cover:
the bases 113, 123 of the light guides 11, 12;
a part of the branches 111, 121 of the light guides 11, 12;
a part of the support faces 150, 151 of the support element 15.

By virtue of this fixing clamp 16, the light guides 11 and 12 and the support element 15 are well fixed to the heat sink 10.

In a nonlimiting embodiment, the fixing clamp 16 comprises a first fixing orifice 160 arranged facing a second fixing orifice 106 of the heat sink 10.

A mounting screw (not illustrated) inserted into the first fixing orifice 160 and into the second fixing orifice 106 makes it possible to fix the fixing clamp 16 onto the heat sink 10 and thus fix the light guides 11, 12 and support element 15 assembly onto the heat sink 10.

With the fixing clamp 16 and the referencing pins 112, 122 inserted into the referencing orifices 104, 105 seen previously, the light guides 11, 12 and support element 15 assembly can no longer move. There is thus no mechanical play. The input faces 110, 120 of the light guides 11, 12 cannot move. The coupling of the rays emitted by the light sources 14 does not therefore change during the use of the headlight 2.

It will be noted that the fixing clamp 16 can of course be used in the first embodiment of the light module 1 described previously (light module without the support element 15).

Another subject of the invention is a lighting device 2 for a motor vehicle V comprising a light source 10 according to the invention and a casing 20.

In a nonlimiting example, the lighting device 2 is a headlight.

The lighting device 2 is described herein below with reference to FIGS. 8 to 10.

The lighting device 2 comprises:
a light module 1 comprising a heat sink 10 comprising two mounting faces 100, 101 forming an angle θ between them;
at least two light guides 11, 12, each comprising an input face 110, 120 and a branch 111, 121, each input face 110, 120 being arranged facing one of the mounting faces 100, 101 of the heat sink 10 and being adapted to couple the light rays emitted by at least one light source 14 into the associated light guide 11, 12;
a casing 20 comprising a front face 200 on the side of which the light guides 11, 12 are arranged, and a rear face 201 on which the heat sink 10 is mounted, the casing 20 comprising an opening 202 into which the two mounting faces 100, 101 of the heat sink 10 are inserted; and
a protection screen (not illustrated).

Thus, the lighting device 2 comprises a light module 1 according to the first embodiment described previously (without the support element 15) or according to the second embodiment described previously (with the support element 15).

In a nonlimiting embodiment, the heat sink 10 is mounted on the casing 20 by means of screws (not illustrated) which are inserted into mounting orifices 103 of the heat sink 10 and corresponding mounting orifices (not illustrated) on the casing 20.

Figure 9:
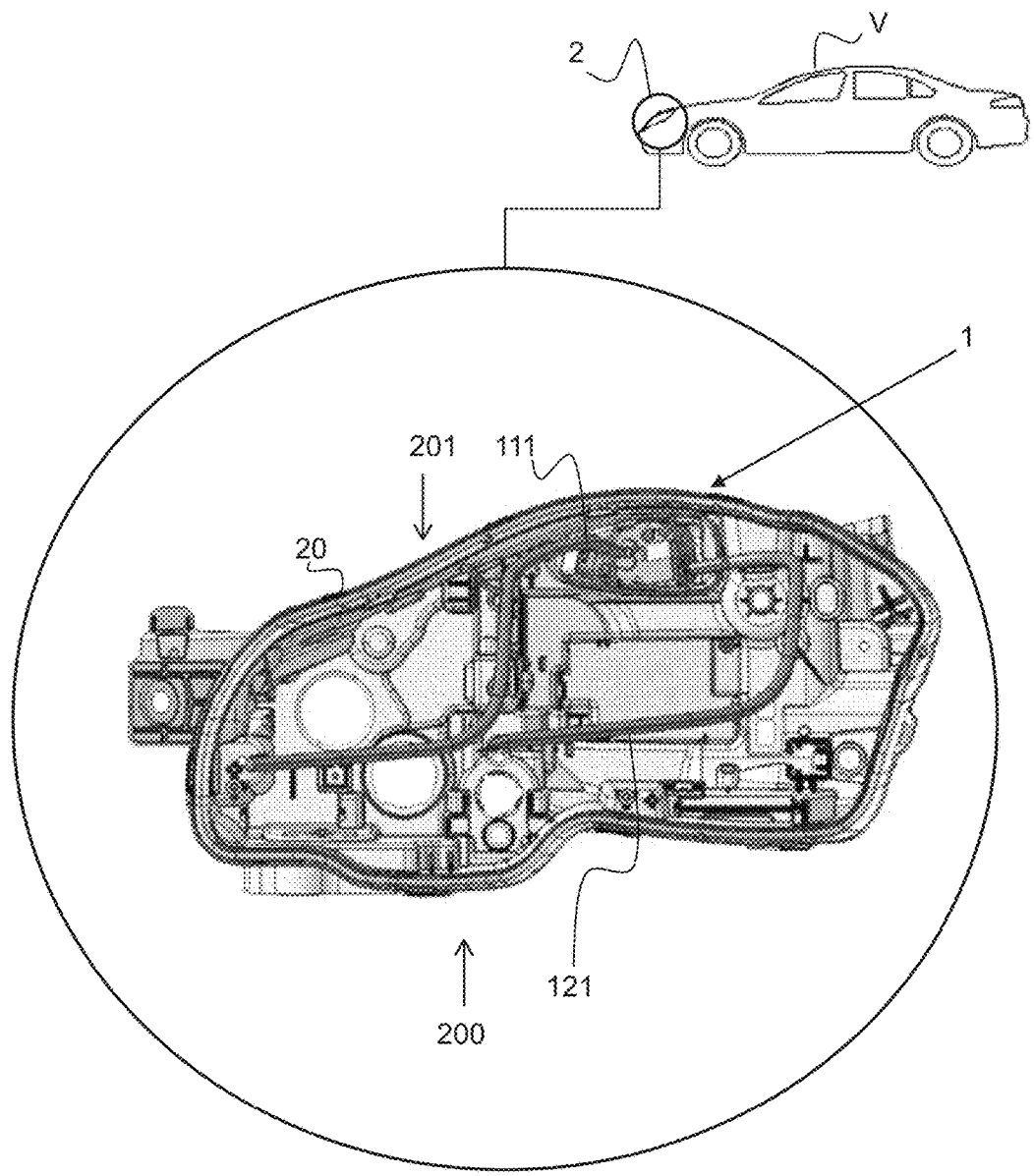
FIG. 9 illustrates the light module of FIGS. 5 to 7 in a lighting device for a motor vehicle.

In the nonlimiting example illustrated in FIGS. 8 and 9, the light module 1 conforms to the second embodiment described previously, namely the light module 1 which comprises the support element 15.

As can be seen, the two light guides 11, 12 are separated and the branches 111, 121 of the two light guides 11, 12 have different directions. They are arranged in the casing 20 in a predetermined way which is generally defined by the manufacturer of the motor vehicle V.

Figure 10:
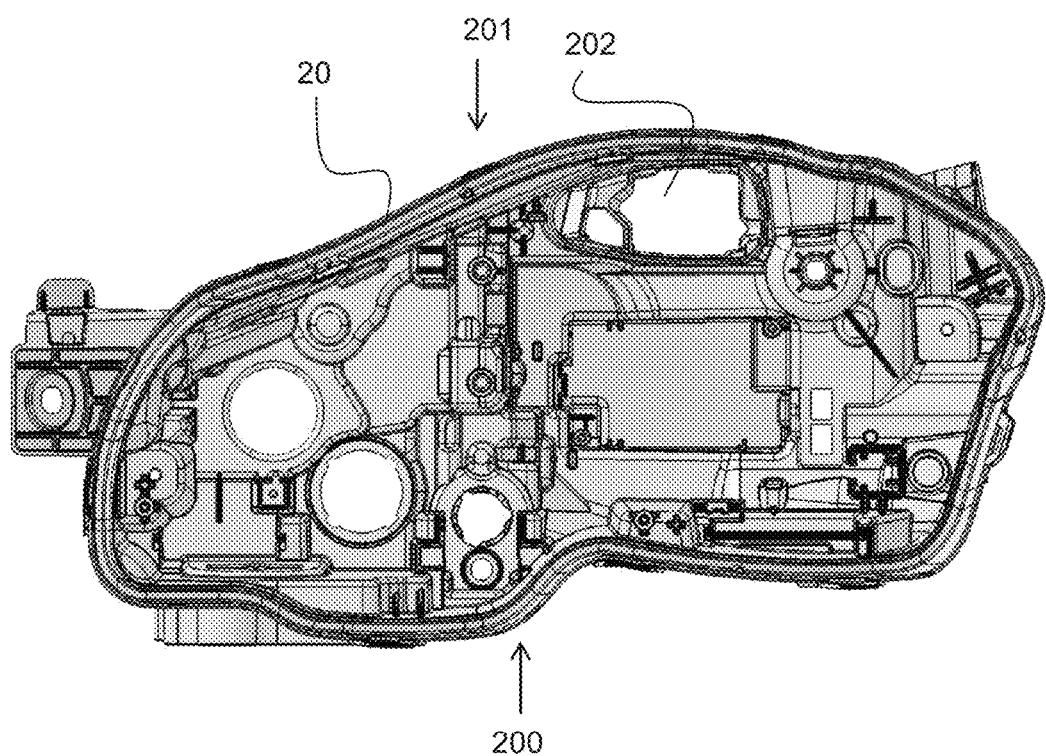
FIG. 10 illustrates the casing of a lighting device for a motor vehicle, adapted to receive a light module of FIGS. 1 to 9.

The casing 20 alone is represented in FIG. 10. FIG. 10 illustrates in particular the opening 202 in which the two mounting faces 100, 101 of the heat sink 10 are inserted.

Obviously, the description of the invention is not limited to the embodiments described above.

Thus, in a nonlimiting embodiment, the heat sink 10 can comprise more than two mounting faces.

Thus, in a nonlimiting embodiment, the light module 1 can comprise more than two light guides 11, 12. In this case, the heat sink 10 comprises two mounting faces 100, 101 but can comprise more than two mounting faces 100, 101 depending on the arrangement of the light guides in the headlight 2 and on the position of the input faces of each light guide. The same applies for the support element 15 which will have as many support faces as the heat sink 10 has mounting faces.

Thus, in a nonlimiting embodiment, it is possible to have a mounting face on which one or more light guides are mounted.

Thus, the invention described offers in particular the following advantages:
it makes it possible to mount (directly or via the support element 15) different light guides on a same heat sink 10. The cost is thus lower because it uses fewer parts than a solution in which each light guide is mounted on a different heat sink 10;
the assembly of the light guides on the heat sink 10 (whether directly or via the support element 15) is simple and easy;
it is no longer necessary to have light guides with branches that are parallel to one another. Any direction and arrangement of the light guides in the casing 20 can be produced while retaining optimal performance levels in photometric terms. Greater flexibility is thus obtained for the arrangement of the light guides;
it makes it possible for the light sources 14 to be in the axis Ax of the light guides so as to have a better efficiency in optical terms. There is no longer any light loss at the input faces of the light guides; and
it avoids excessively distorting the light guides for their input face to be able to be positioned correctly on the heat sink 10, unlike the solution in which the heat sink 10 comprises only a single planar face.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light module for a motor vehicle comprising:
a heat sink, including at least two mounting faces forming an angle (θ) between them;
at least two light guides, each comprising an input face and a branch; and
at least two light sources, each arranged at one of said input faces of said at least two light guides;
wherein each of said input faces is arranged facing a respective one of said at least two mounting faces of said heat sink and is adapted to couple light rays emitted by each of said at least two light sources into respective at least two light guides, and wherein each of said at least two mounting faces of said heat sink comprises a first referencing orifice having inserted therein a corresponding referencing pin of each of said at least two light guides.

2. The light module according to claim 1, wherein one of said input faces is arranged facing one of said at least two mounting faces of said heat sink on an axis substantially at right angles to said at least two mounting faces.

3. The light module according to claim 1, wherein said light module further comprises at least one printed circuit board to which said at least two light sources are connected, wherein the printed circuit board comprises a second referencing orifice through which the referencing pin is inserted into the first referencing orifice.

4. The light module according to claim 3, wherein at least one of said at least two light sources is mounted directly on each of said at least two mounting faces of said heat sink.

5. The light module according to claim 3, wherein said at least two light sources are mounted on said at least one printed circuit board.

6. The light module according to claim 1, wherein at least one printed circuit board is mounted directly on said at least two mounting faces of said heat sink.

7. The light module according to claim 6, wherein at least one of said at least two light sources is mounted directly on each of said at least two mounting faces of said heat sink.

8. The light module according to claim 1, wherein said light module further comprises a support element comprising two support faces which are superposed respectively on said at least two mounting faces of said heat sink, each of said at least two light guides being mounted directly on one of said two support faces which is associated with each of said at least two light guides.

9. The light module according to claim 8, wherein at least one printed circuit board forms said support element.

10. The light module according to claim 8, wherein each of said two support faces of said support element comprises a second referencing orifice through which the referencing pin is inserted into the first referencing orifice.

11. The light module according to claim 8, wherein said at least two light sources are mounted on said at least one printed circuit board.

12. The light module according to claim 1, wherein said at least two light sources are semiconductive emitting chips.

13. The light module according to claim 1, wherein said light module further comprises a fixing clamp positioned over a part of said at least two light guides.

14. The light module according to claim 13, wherein said fixing clamp comprises a first fixing orifice arranged facing a second fixing orifice of said heat sink.

15. The light module according to claim 1, wherein output faces of each of said at least two light sources are parallel to the input face of each of said at least two light guides.

16. The light module according to claim 1, wherein each of said at least two light sources emits a different wavelength of light than the other.

17. The light module according to claim 1, wherein said at least two mounting faces form a contiguous surface.

18. The light module according to claim 1, wherein each of said at least two light sources includes a plurality of light emissive elements configured to optically couple to each of said input faces of respective at least two light guides.

19. A lighting device for a motor vehicle, the lighting device comprising:

the light module according to claim 1; and a casing comprising a front face on the side of which are arranged said at least two light guides and a rear face on which is mounted said heat sink, said casing comprising an opening into which is inserted said at least two mounting faces of said heat sink.

20. A lighting device for a motor vehicle, the lighting device comprising:

the light module according to claim 3; and a casing comprising a front face on the side of which are arranged said at least two light guides and a rear face on which is mounted said heat sink, said casing comprising an opening into which is inserted said at least two mounting faces of said heat sink.

* * * * *